United States Patent
Dhyllon

(10) Patent No.: US 9,559,564 B1
(45) Date of Patent: Jan. 31, 2017

(54) TORQUE AMPLIFYING APPARATUS

(71) Applicant: Amen Dhyllon, Wynnewood, PA (US)

(72) Inventor: Amen Dhyllon, Wynnewood, PA (US)

( * ) Notice: Subject to any disclaimer, the term of this patent is extended or adjusted under 35 U.S.C. 154(b) by 0 days.

(21) Appl. No.: 15/294,714

(22) Filed: Oct. 15, 2016

(51) Int. Cl.
| | |
|---|---|
| *H02K 7/075* | (2006.01) |
| *F16H 37/02* | (2006.01) |
| *F16H 1/20* | (2006.01) |
| *H02K 7/116* | (2006.01) |

(52) U.S. Cl.
CPC ............. *H02K 7/075* (2013.01); *F16H 1/203* (2013.01); *F16H 37/02* (2013.01); *H02K 7/116* (2013.01)

(58) Field of Classification Search
CPC ......... H02K 7/075; H02K 7/116; F16H 1/203; F16H 37/02
USPC .................................... 310/90.5, 20
See application file for complete search history.

(56) References Cited

U.S. PATENT DOCUMENTS

| | | | |
|---|---|---|---|
| 4,208,592 A | | 6/1980 | Leibow et al. |
| 5,296,799 A | | 3/1994 | Davis |
| 5,719,459 A | * | 2/1998 | Hasegawa ............ B62D 5/0403 180/444 |
| 5,789,835 A | * | 8/1998 | Obara .................. B23Q 1/4804 310/80 |
| 5,917,248 A | * | 6/1999 | Seguchi .................... B60K 6/26 290/31 |
| 6,006,519 A | | 12/1999 | Hormell |
| 6,051,809 A | | 4/2000 | Colella |
| 6,163,148 A | * | 12/2000 | Takada ..................... B62M 6/45 180/206.3 |
| 2005/0011688 A1 | | 1/2005 | Bailey, Sr. |
| 2008/0122299 A1 | * | 5/2008 | Cristoforo .............. H02K 7/075 310/20 |
| 2010/0244590 A1 | * | 9/2010 | Essex ...................... F03H 99/00 310/20 |
| 2010/0296949 A1 | | 11/2010 | Corley |
| 2012/0227389 A1 | * | 9/2012 | Hinderks .................. F01B 1/10 60/317 |

* cited by examiner

*Primary Examiner* — Alex W Mok
(74) *Attorney, Agent, or Firm* — Adam W Bell, Esq.

(57) ABSTRACT

A torque amplifying apparatus includes a rotor, a set of rotor magnets, a set of stator magnets, and an assembly of a lever and a crank member. The rotor magnets are disposed diametrically across the rotor. The rotor is rotated by an electric motor connected to the rotor to generate a rotating magnetic field around the rotor via the rotor magnets. The stator magnets are slidably positioned at a predefined distance from the rotor on outer guides, and slide in reciprocating motion in response to the rotating magnetic field, where a first stator magnet positioned diametrically opposite to a second stator magnet reciprocates in opposing directions. The lever is connected to each stator magnet to rotate a crank member, where the first stator magnet and the second stator magnet rotates the crank member to amplify and transmit the torque from the electric motor to the crank member.

10 Claims, 4 Drawing Sheets

TORQUE AMPLIFYING APPARATUS

BACKGROUND OF THE INVENTION

A. Technical Field

The present invention generally relates to a device which can increase torque generated from a source. More specifically, the present invention relates to a torque amplifying apparatus which amplifies torque using strong permanent magnets which are operatively coupled to transmission gears.

B. Description of Related Art

Torque amplifiers are mechanical devices capable of amplifying torque of a rotating shaft. Torque amplifiers have myriads of applications. For example, torque amplifiers find use in amplifying the torques of steam engines, combustion engines and electric motors. Several types of torque amplifiers are available today. Examples of types of torque amplifiers include friction based torque amplifiers, gear based torque amplifiers, hydraulic torque amplifiers and electric torque amplifiers.

In one example of a torque amplifier design, a torque amplifier comprises a pair of juxtaposed and coaxial driving discs. The pair of driving discs are driven in opposite directions, by a rotary power source with a first torque. Examples of rotary power sources include combustion engines and induction motors. Furthermore, a pair of driving discs are mechanically coupled to a connector shaft via a friction type clutching disc. The connector shaft is configured to rotate on the same rotational axis as that of the pair of driving discs. The connector shaft rotates with a second torque, where the second torque being determined by friction exerted by the friction type clutching disc. The friction exerted by the friction type clutching disc is adjustable to make the second torque greater than the first torque. Since the torque amplifier utilizes such frictional forces to amplify the torque, the torque amplifier loses some input energy as heat generated due to friction. As a result, the torque amplifier is largely energy inefficient. Moreover, the torque amplifier lacks scalability.

Hence, existing torque amplifiers have several limitations. In existing torque amplifiers, a substantial amount of input energy is lost as heat generated due to friction. As a result, existing torque amplifiers consume fuel inefficiently. Moreover, existing torque amplifiers lack scalability.

Therefore, there is a need in the art for an improved torque amplifier wherein energy lost due to friction is minimal. There is also a need in the art for a scalable torque amplifier.

SUMMARY OF THE INVENTION

The torque amplifying apparatus disclosed here addresses the above mentioned issues. The torque amplifying apparatus comprises a rotor, a set of rotor magnets, a set of stator magnets, and an assembly of a lever and a crank member. The rotor is mounted on a frame, and the rotor magnets are disposed diametrically across the rotor. The rotor is rotated by an electric motor axially connected to the rotor to generate a rotating magnetic field around the rotor via the rotor magnets. The stator magnets are slidably positioned at a predefined distance from the rotor on outer guides, where the outer guides are radially positioned corresponding to the rotor. The stator magnets slide in reciprocating motion in response to the rotating magnetic field generated in the rotating rotor magnets, where a first stator magnet positioned diametrically opposite to a second stator magnet reciprocates in opposing directions. The lever is connected to each stator magnet to rotate a crank member, where the first stator magnet and the opposingly positioned second stator magnet rotates the crank member to amplify and transmit the torque from the electric motor to the crank member.

In an embodiment, the crank members are bevel gears of a miter bevel gear assembly. In an embodiment, the miter bevel gear assembly further comprises an output bevel gear perpendicularly positioned and obliquely engaged to the bevel gears to receive the rotary motion from the bevel gears. In an embodiment, the output bevel gear is coupled to a bevel shaft, where a first spur gear is fixedly attached at a distal end of the bevel shaft transfers the torque to a connector shaft via a second spur gear fixedly attached to a distal end of the connector shaft. In an embodiment, the connector shaft is configured to drive an output shaft coupled to an alternator via a belt drive.

In an embodiment, the belt drive connects a first driving pulley attached distally to the connector shaft and a second driving pulley attached distally to the output shaft, to transfer the amplified torque to the output shaft. In an embodiment, the outer guides are one of a linear slider guide and a curved slider guide. In an embodiment, each of the linear slider guide and the curved slider guide is an anti-friction type slider guide. In an embodiment, the at least one stator magnet and at least two rotor magnets are one of a permanent magnet and an electromagnet. In an embodiment, torque amplifying apparatus further comprises a magnetic holder sandwiched between each stator magnet and the outer guide to attach the stator magnet to the outer guide, and to allow a friction free sliding of the stator magnets along the outer guides.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
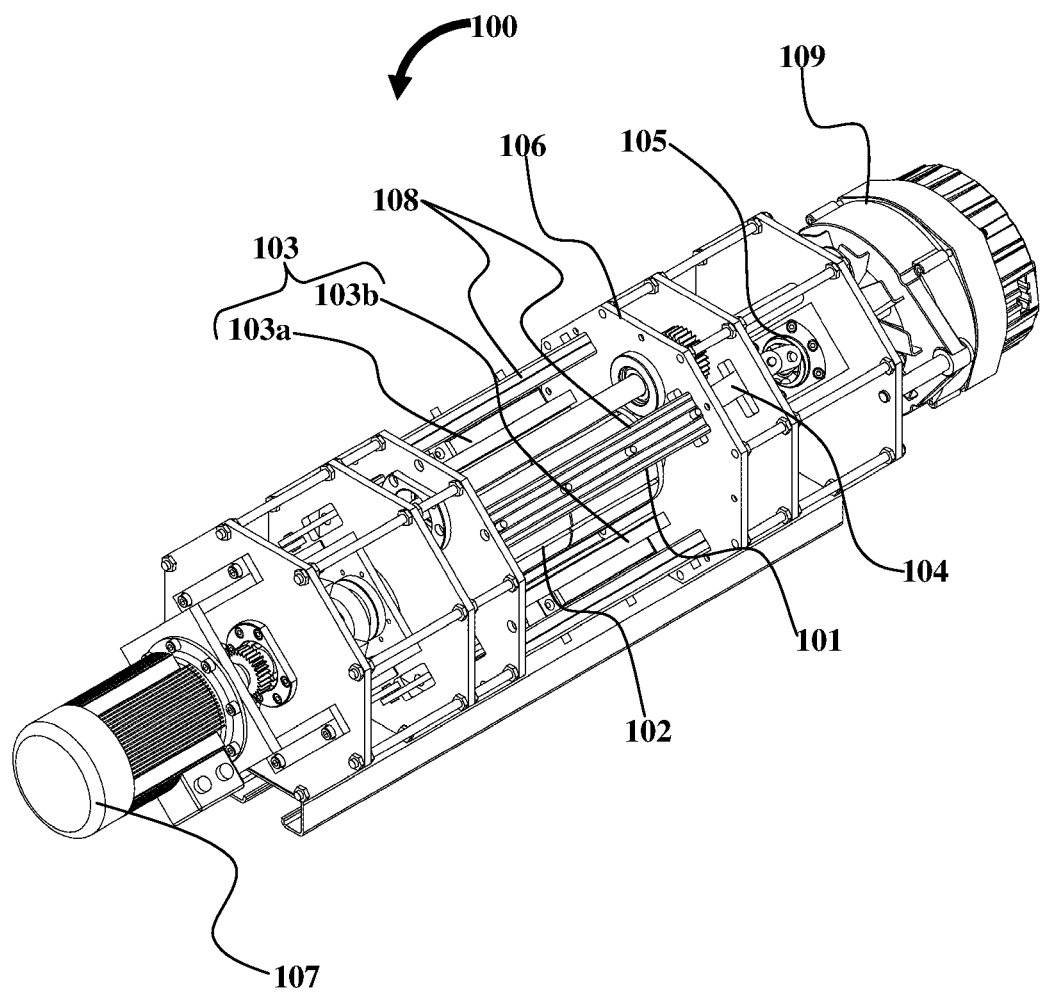
FIG. 1 exemplarily illustrates a top perspective view of the torque amplifying apparatus.

FIG. 1 exemplarily illustrates a top perspective view of the torque amplifying apparatus 100. The torque amplifying apparatus 100 comprises a rotor 101, a set of rotor magnets 102, a set of stator magnets 103, and an assembly of a lever 104 and a crank member 105. The rotor 101 is mounted on a frame 106, and the rotor magnets 102 are disposed diametrically across the rotor 101. The rotor 101 is rotated by an electric motor 107 axially connected to the rotor 101 to generate a rotating magnetic field around the rotor 101 via the rotor magnets 102. The electric motor 107 which provides the input drive is, for example, a single phase ac motor with a power rating of 0.37 kw (kilowatt) and 1500 rpm (rotations per minute). The stator magnets 103 are slidably positioned at a predefined distance from the rotor 101 on outer guides 108, where the outer guides 108 are radially positioned corresponding to the rotor 101.

The stator magnets 103 slide in reciprocating motion in response to the rotating magnetic field generated in the rotating rotor magnets 102, where a first stator magnet 103a positioned diametrically opposite to a second stator magnet 103b reciprocates in opposing directions. The lever 104 is connected to each stator magnet 103 to rotate a crank member 105, where the first stator magnet 103a and the opposingly positioned second stator magnet 103b rotates the crank member 105 to amplify and transmit the torque from the electric motor 107 to the crank member 105. The transmitted torque is used to drive an alternator 109 as further explained in FIGS. 2A-3.

By principle, the torque amplifying apparatus 100 uses permanent magnets in the stator side and the rotor side to generate power. Basically, in conventional systems, stator means stationary portion of an electric generator and rotor means rotary part of the generator. When the rotor rotates, it cuts magnetic flux of the stator to generate electric power using additional source of energy. However, in the torque amplifying apparatus 100, the stator magnets 103 can no longer be referred to as stator magnets 103 as its not stationary as the term describes. Here, in the case of the torque amplifying apparatus 100, the linear motion of the stator magnets 103 reciprocating in the piston at 0° (degree), 90°, 180°, and 270° causes a strong magnetic field which intercepts with the magnetic field of the rotating shafts mounted on the rotor 101. The linear reciprocating motion of the stator magnets 103 is caused by magnetic attractive and repulsive forces due to continuous change of polarity of the rotor magnets 102 to generate power. Here, the alignment of the rotor magnets 102 and the stator magnets 103, and the reciprocation of the stator magnets 103 rotate the crank members 105 which effectively amplifies the torque supplied from the actual electric motor 107.

Figure 2A:
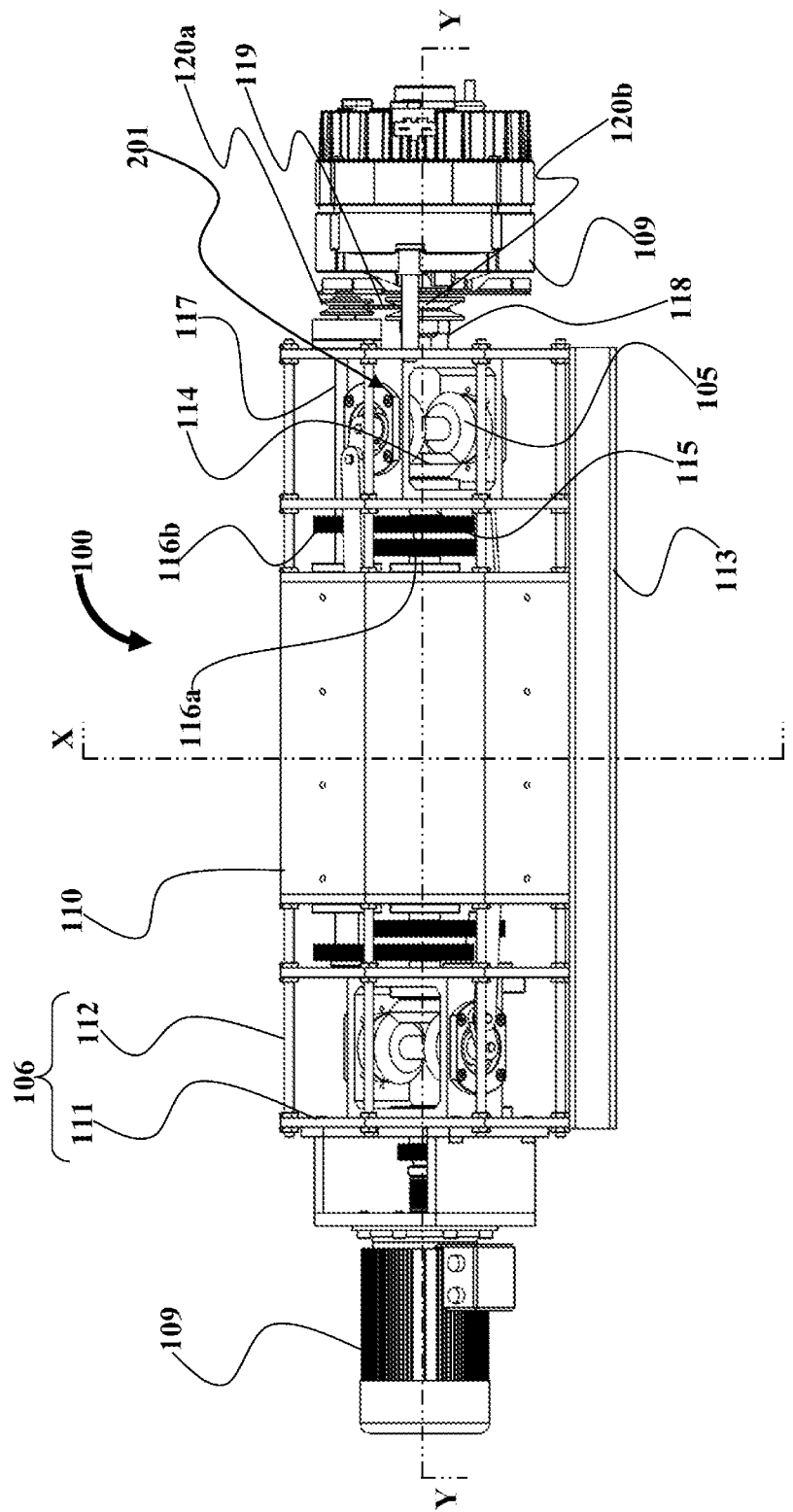
FIG. 2A exemplarily illustrates a top plan view of the torque amplifying apparatus.
Figure 2B:
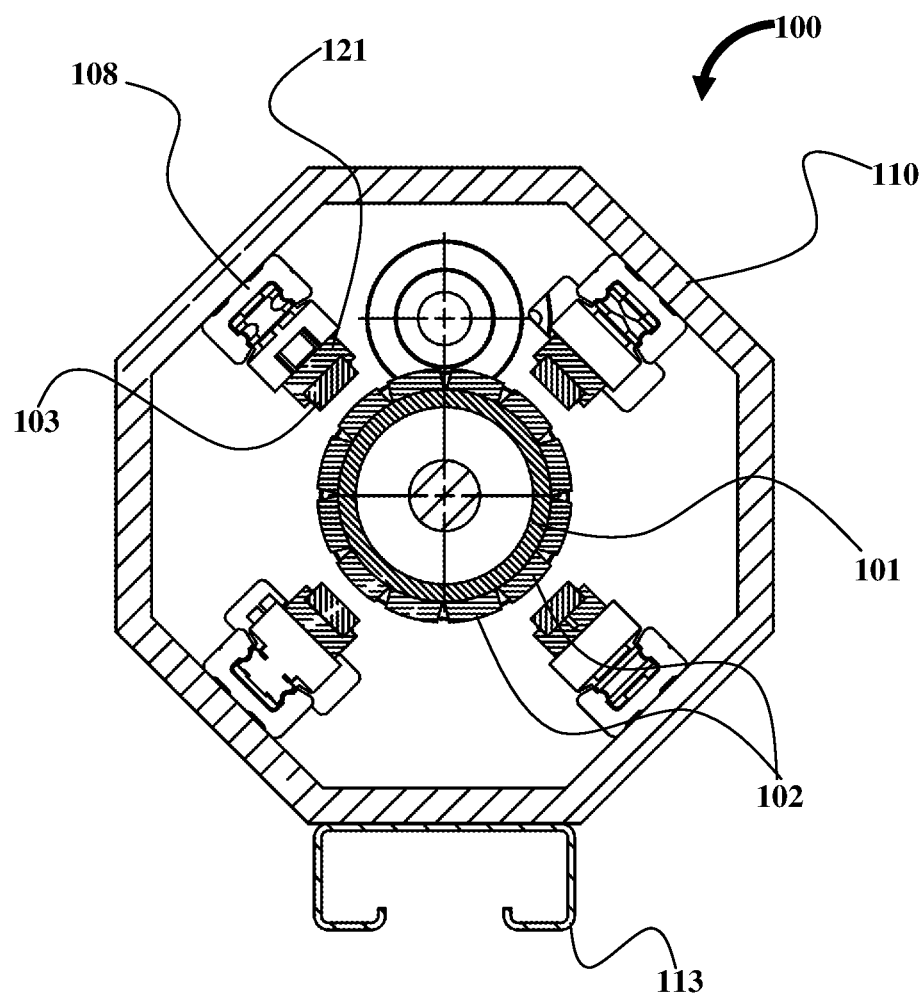
FIG. 2B exemplarily illustrates a side sectional view of the torque amplifying apparatus along section X-X as shown in FIG. 2A.

FIG. 2A exemplarily illustrates a top plan view of the torque amplifying apparatus 100, and FIG. 2B exemplarily illustrates a side sectional view of the torque amplifying apparatus 100 along section X-X as shown in FIG. 2A. The rotor 101, rotor magnets 102, and the stator magnets 103, as shown in FIG. 1 are secured within a covering member 110. The frame 106 comprises hexagonal shaped plates 111 with elongate rods 112 inserted through holes positioned adjacent to the sides of the hexagonal shaped plates 111. The torque amplifying apparatus 100 is supported on a base plate 113, and the base plate 113 primarily supports the frame 106 which carries the bulk weight of the torque amplifying apparatus 100. The alternator 109 is axially positioned with respect to the torque amplifying apparatus 100 to receive the amplified torque.

In an embodiment, the crank members 105 are, for example, bevel gears 105 of a miter bevel gear assembly 201. In an embodiment, the miter bevel gear assembly 201 further comprises an output bevel gear 114 perpendicularly positioned and obliquely engaged to the bevel gears 105 to receive the rotary motion from the bevel gears 105. In an embodiment, the output bevel gear 114 is coupled to a bevel shaft 115, where a first spur gear 116a is fixedly attached at a distal end of the bevel shaft 115 transfers the torque to a connector shaft 117 via a second spur gear 116b fixedly attached to a distal end of the connector shaft 117. In an embodiment, the connector shaft 117 is configured to drive an output shaft 118 coupled to the alternator 109 via a belt drive 119. In an embodiment, the belt drive 119 connects a first driving pulley 120a attached distally to the connector shaft 117 and a second driving pulley 120b attached distally to the output shaft 118, to transfer the amplified torque to the output shaft 118.

Referring to FIG. 2B, in an embodiment, the outer guides 108 are, for example, a linear slider guide or a curved slider guide. In an embodiment, each of the linear slider guide and the curved slider guide is an anti-friction type slider guide. In an embodiment, the at least one stator magnet 103 and at least two rotor magnets 102 are one of a permanent magnet and an electromagnet. The FIG. 2B shows the rotor 101 and the rotor magnets 102 mounted around the rotor 101. The FIG. 2B further shows the stator magnets 103 inwardly mounted within the covering member 110, as shown in FIG. 2A. The stator magnets 103 are positioned on a set of sliding guideways or the outer guides 108 as described in FIG. 1. In an embodiment, a magnetic holder 121 is also sandwiched between each stator magnet 103 and the outer guide 108 to attach the stator magnet 103 to the outer guide 108, and to allow a friction free sliding of the stator magnets 103 along the outer guides 108.

The rotor 101 or the rotor shaft carries, for example, 12 permanent neodymium iron boron magnets with a cross section 15×6 mm (millimeter). The rotor shaft is made from non-magnetic stainless steel and is supported on deep groove radial ball bearings. The stator section with the stator magnets 103 comprises, for example, four permanent neodymium iron boron magnets of cross section 6.7×15 mm, arranged on an inner periphery of the covering member 110 or the stator frame at 90 degrees' angle. The stator magnets 103 are mounted on anti-friction linear guides for effortless sliding and latter are fixed to the stator frame. The rotor magnets 102 are arranged such that the polarity of the alternate rotor magnets 102 are N-S-N-S or North-South-North-South.

In an example of construction,

| Component | Units | Quantity |
|---|---|---|
| Rotor Diameter | mm | 60 |
| Rotor Length | mm | 200 |
| Rotor Magnetic Size | mm | 6 × 15 × 60 |
| No. of Magnets on Rotor | nos | 12 |
| Air Gap | mm | 6 |
| Sliding Magnet size | mm | 6.7 × 15 × 120 |
| Sliding Stroke | mm | 40 |
| Component | Units | Quantity |
| No. of Sliding Magnets | mm | 4 @ 90 degrees |
| Magnetic Material | — | Nd Feb - Neodymium Iron Boran |
| Input Power Motor | kW | 0.37/200 V/50 Hz, Single Phase Input |
| Speed | RPM | 1500 |

Figure 3:
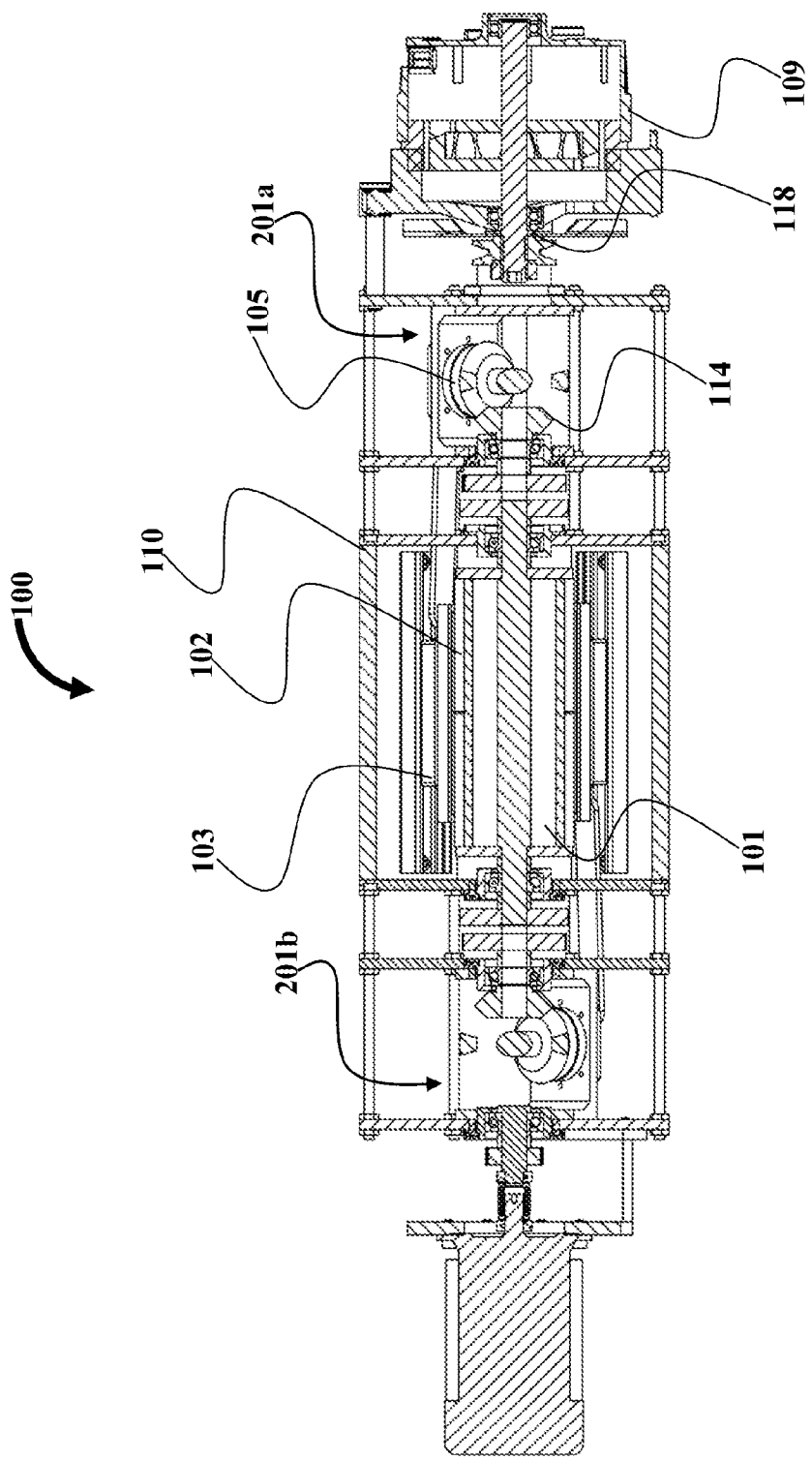
FIG. 3 exemplarily illustrates a sectional view of the torque amplifying apparatus along section Y-Y as shown in FIG. 2A.

FIG. 3 exemplarily illustrates a sectional view of the torque amplifying apparatus 100 along section Y-Y as shown in FIG. 2A. The torque amplifying apparatus 100 disclosed here is non-contact type device for creating a magnetic field. Four permanent magnets, or the stator magnets 103 are arranged on the inner periphery of stator covering member 110 reciprocate due to magnetic field created by the permanent magnets or rotor magnets 102 mounted on the rotor 101. The reciprocation of stator magnets 103 is caused by magnetic attraction and repulsion, due to continuous change of polarity of the rotor magnets 102. These reciprocating movements of the stator magnets 103 are converted into rotary motion in a miter gear box 201a through a crank and lever mechanism which comprises the lever 104 and the crank member 105 as described in FIG. 1.

The miter gear box 201a comprises the crank member (or the bevel gears 105) and the output bevel gear 114, which in turn drives an output shaft 118 via a connector shaft 117 as shown in FIG. 2A. A second miter gear box 201b comprising the bevel gears 105 and the output bevel gear 114 is positioned opposingly to the first miter gear box 201b to receive the reciprocating movements of the stator magnets 103, thereby increasing the net torque even further. The output shaft 118 is coupled to the alternator 109 or an output generator. The arrangement of the gear ratios of the miter gear box 201 and the spur gear 116a and 116b is in such a way that the output torque is more than the input torque, which means the power generation is amplified. The amplified power that is so generated is used for any of the appliances-industrial or domestic.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A torque amplifying apparatus, comprising:
   a rotor mounted on a frame;
   a set of rotor magnets disposed diametrically across the rotor, wherein the rotor is rotated by an electric motor axially connected to the rotor, to generate a rotating magnetic field around the rotor via the rotor magnets;
   a set of stator magnets slidably positioned at a predefined distance from the rotor on outer guides, wherein the outer guide is radially positioned corresponding to the rotor, wherein the stator magnets slide in reciprocating motion in response to the rotating magnetic field generated in the rotating rotor magnets, wherein a first stator magnet positioned diametrically opposite to a second stator magnet reciprocates in opposing directions; and
   a lever connected to each stator magnet is configured to rotate a crank member, wherein the first stator magnet and the opposingly positioned second stator magnet rotates the crank member to amplify and transmit the torque from the electric motor to the crank member.

2. The torque amplifying apparatus of claim 1, wherein the crank members are bevel gears of a miter bevel gear assembly.

3. The torque amplifying apparatus of claim 2, wherein the miter bevel gear assembly further comprises an output bevel gear perpendicularly positioned and obliquely engaged to the bevel gears to receive the rotary motion from the bevel gears.

4. The torque amplifying apparatus of claim 3, wherein the output bevel gear is coupled to a bevel shaft, wherein a first spur gear fixedly attached at a distal end of the bevel shaft transfers the torque to a connector shaft via a second spur gear fixedly attached to a distal end of the connector shaft.

5. The torque amplifying apparatus of claim 4, wherein the connector shaft is configured to drive an output shaft coupled to an alternator via a belt drive.

6. The torque amplifying apparatus of claim 5, wherein the belt drive connects a first driving pulley attached distally to the connector shaft and a second driving pulley attached distally to the output shaft, to transfer the amplified torque to the output shaft.

7. The torque amplifying apparatus of claim 1, wherein the outer guide is one of a linear slider guide and a curved slider guide.

8. The torque amplifying apparatus of claim 7, wherein each of the linear slider guide and the curved slider guide is an anti-friction type slider guide.

9. The torque amplifying apparatus of claim 1, wherein the at least one stator magnet and at least two rotor magnets are one of a permanent magnet and an electromagnet.

10. The torque amplifying apparatus of claim 1, further comprising a magnetic holder sandwiched between each stator magnet and the outer guide to attach the stator magnet to the outer guide, and to allow a friction free sliding of the stator magnets along the outer guides.

* * * * *